United States Patent [19]

Araki

[11] Patent Number: 4,503,325
[45] Date of Patent: Mar. 5, 1985

[54] APPARATUS FOR DETECTING VIBRATION BY COMPARING THE PHASE RELATION OF PORTIONS OF A DIVIDED LIGHT IMAGE

[75] Inventor: Kunihio Araki, Tokyo, Japan
[73] Assignee: Ricoh Company, Ltd., Tokyo, Japan
[21] Appl. No.: 367,458
[22] Filed: Apr. 12, 1982

Related U.S. Application Data

[63] Continuation of Ser. No. 117,628, Feb. 1, 1980, abandoned.

[30] Foreign Application Priority Data

Feb. 9, 1979 [JP] Japan ............................ 54-14011
Feb. 9, 1979 [JP] Japan ............................ 54-14012

[51] Int. Cl.³ ........................... G03B 3/00; H01J 40/14
[52] U.S. Cl. .................................. 250/204; 250/209; 354/402

[58] Field of Search .............. 250/201, 204, 209, 578; 356/4; 354/25 R, 25 P, 31, 31 F

[56] References Cited

U.S. PATENT DOCUMENTS

4,071,297 1/1978 Leitz et al. ............................. 356/4
4,185,191 1/1980 Stauffer ................................ 250/204

Primary Examiner—David C. Nelms
Assistant Examiner—Edward P. Westin
Attorney, Agent, or Firm—Wyatt, Gerber, Shoup, Scobey & Badie

[57] ABSTRACT

A vibration detection apparatus detects the vibration of an optical system such as a camera by dividing the incoming rays of light and causing pairs of photosensors to receive the divided rays of light and then comparing the shifts in the phases of the signals output from the pairs of photosensors.

6 Claims, 19 Drawing Figures

FIG. 7A FRONT FOCUSING

FIG. 7B FOCUSED

FIG. 7C BACK FOCUSING

APPARATUS FOR DETECTING VIBRATION BY COMPARING THE PHASE RELATION OF PORTIONS OF A DIVIDED LIGHT IMAGE

This application is a continuation of application Ser. No. 117,628 filed Feb. 1, 1980 and now abandoned.

The present invention relates to an apparatus for detecting vibrations of a camera while taking a photograph and, more particularly, to a vibration detection apparatus in which the rays of light for forming an image are divided by a lens and the divided rays of light are received by photoelectric elements adapted to detect shifts in the phases of the output of pairs of these photoelectric elements, whereby vibration of the camera can be detected.

Conventionally, there is known a vibration detection apparatus for use in cameras which detects vibrations of a camera by measuring mechanically the acceleration, speed and displacement of the camera. However, the accuracy of this type of vibration detection apparatus is not very reliable since mechanical vibrations are detected and the detection apparatus itself can be effected adversely by vibration or shocks. Furthermore, in this conventional type of vibration detection apparatus, the detected level of vibration depends solely on the level of the mechanical vibration of the camera, and yet the amount of permissible vibration may differ, depending upon the magnification of the image which is determined by the focal length of the lens of the camera. Therefore, the vibration detection apparatus of the above-mentioned type is not very suitable for cameras in which the detection vibration level has to be changed in accordance with the magnification of the image.

Furthermore, when this type of vibration detection apparatus is used in combination with an alarm which gives a warning to the photographer when the camera is ready for taking a photograph and vibrations beyond a predetermined level are detected, the above-mentioned shortcoming of the vibration detection apparatus makes it rather diffcult to adjust the alarm when changing the magnification of the image. Further, it is preferable that the level of the vibrations activating the alarm be changed in accordance with a change in the shutter speed. Otherwise, the level of vibrations activating the alarm will simply correspond to the detected vibration level.

In another conventional vibration detection apparatus, a dip effect of the photoelectric elements is utilized so that the vibrations of a camera are detected by measuring the change in resistance of a photoelectric element. In the vibration detection apparatus utilizing the dip effect of the photoelectric element, the vibrations of the camera cannot readily be detected in the defocused areas. Further, since the resistance of the photoelectric element changes in accordance with the change of the brightness of an object, a periodic change of the intensity of illumination, as in the case of use with a fluorescent lamp, results in undue noise in the output of the photoelectric element.

SUMMARY OF THE INVENTION

It is a primary object of the invention to provide a vibration detection apparatus which detects the vibrations of an optical system of the camera by dividing an incoming ray of light for image formation and causing respective pairs of photosensors in at least one group of photosensors to receive the divided rays of light, and detecting whether the directions for any shift in the phase of the output of each pair of the photosensors is the same or opposite.

Unlike the conventional vibration detection apparatus utilizing the dip effect of the photoelectric element, the vibration detection apparatus according to the invention has a high reliability for the detection of vibration, and vibration can also be detected from light which has not been fully focused. Furthermore, in the vibration detection apparatus according to the invention, it is not the change of the output of the photosensors which is detected, but the change of the phase in the output of the photosensors, so that a variation in illumination does not create adverse effects in the detection of vibration. Furthermore, since essentially the vibrations of the light from an image are detected in the invention, the vibration detection level can be changed in proportion to the focal length of the lens with respect to the same level of mechanical vibrations and, therefore, the vibration detection apparatus according to the invention is useful in such an optical system as a camera, in which the absolute value of the vibration becomes a problem.

Another object of the invention is to provide an apparatus for detecting the vibrations of an optical apparatus and providing a suitable alarm for too high a level of vibration, wherein the level of the alarm is changed in accordance with photographing conditions.

DESCRIPTION OF THE PREFERRED EMBODIMENT

Figure 1A:
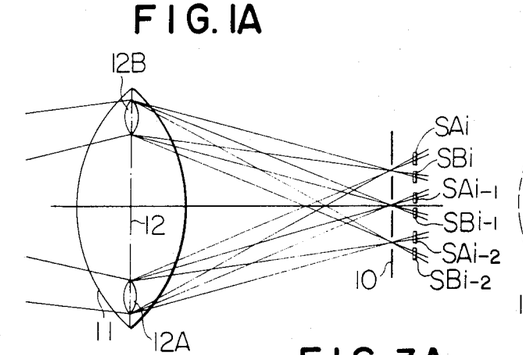
FIGS. 1A and 1B schematically illustrate part of an auto-focusing apparatus of the present invention.
Figure 1B:
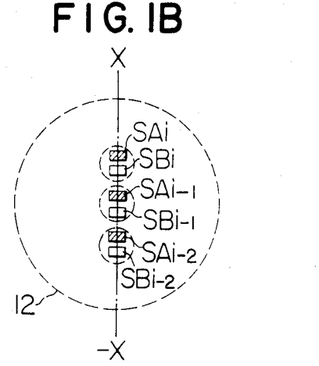

Referring to FIGS. 1A and 1B, there is shown part of an auto-focusing apparatus which is capable of detecting and indicating the vibrations of a camera while taking a photograph. In FIGS. 1A and 1B, the rays of light from an image to be photographed pass through part of exit pupil divisional portions 12A and 12B of an exit pupil 12 of a lens 11, and are divided so that light from portion 12A is directed to enter photosensors $SA_o$, ... $SA_i$ ... $SA_n$ of group A and light from portion 12B is directed to enter photosensors $SB_o . . . SB_i . . . SB_n$ of group B through an optical system 10 formed by pin holes, slits, lenticular lenses, fly eye lenses or the like. The photosensors $SA_o$ and $SB_o$, ... $SA_i$ and $SB_i$ ... $SA_n$ and $SB_n$ are respectively paired and receive the light established by the optical system 10 placed at a focal plane.

Figure 2:
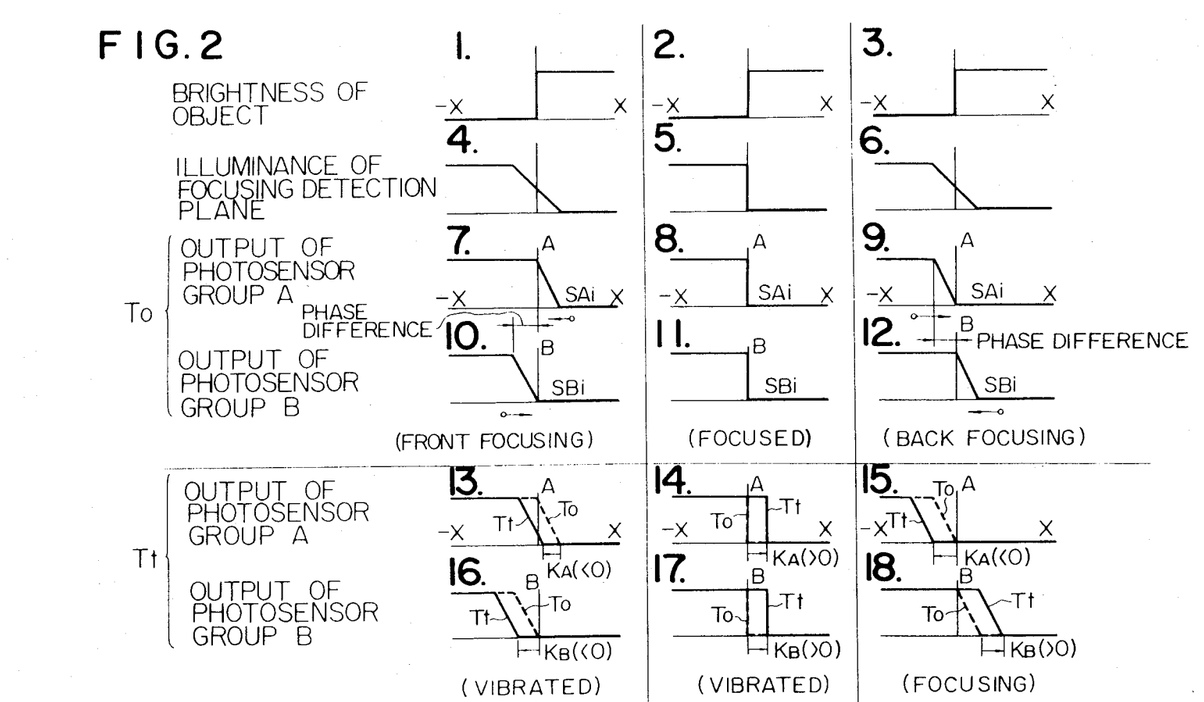
FIGS. 2, 3A, 3B and 3C illustrate graphs for explaining the principle of the invention.

Referring to FIG. 2, the uppermost three graphs (1), (2), (3) illustrate the brightness of an object which is half dark. The image of the object is inverted by the lens 11, and when the lens 11 is in focus, the illuminance of the image of the object on the focusing detection plane is clear-cut as shown in graph (5). However, when the lens 11 is not focused, although the dark portion and the light portion are likewise inverted by the lens 11, the boundary between them is not quite as clear as shown in graphs (4) and (6), and there occurs some difference between the phase of the output of the photosensor group A and the phase of the output of the photosensor group B as shown in graphs (7), (10), (9) and (12). Furthermore, the shifting directions of the two phases are respectively opposite when the lens 11 is moved forwardly and rearwardly to focus the image. When the focusing is performed, starting from the front focusing state or from the rear focusing state, the respective shifting directions of the output phases of the photosensor group A and group B are opposite to each other, and are shown by the arrow 0→ in the graphs (7) and (10), graphs (9) and (12), and graph (18).

On the other hand, should some vibrations occur, the respective shifting directions of the output phase of the photosensor groups A and B are identical in any case (graphs (13), (14), (16) and (17)).

Figure 3A:
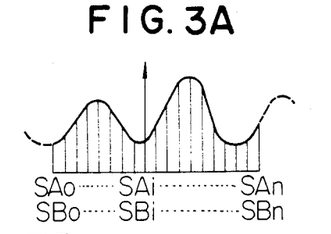
Figure 3B:
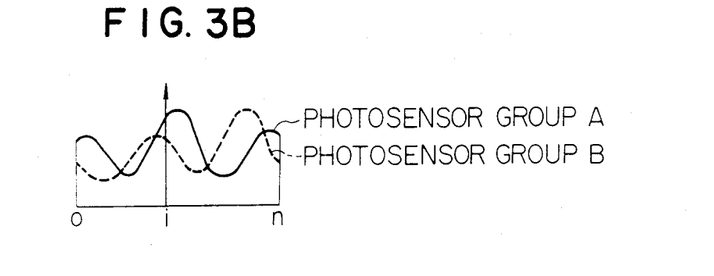
Figure 3C:
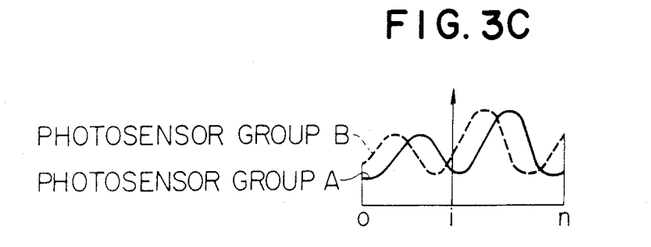

FIGS. 3A, 3B and 3C respectively show the illuminances of an image of an object on the focusing detection plane. More particularly, FIG. 3A shows the illuminance of the image of the object in focus, FIG. 3B shows that in the front focusing, and FIG. 3C shows that in the rear focusing.

Figure 4A:
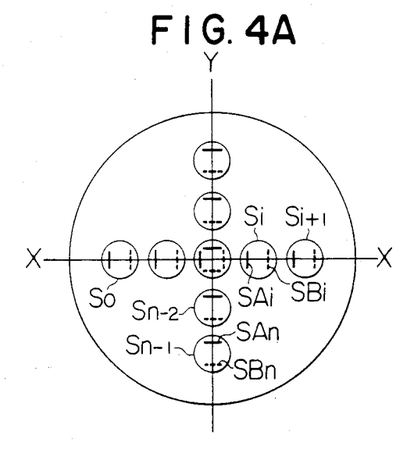
FIG. 4A illustrates an arrangement of photosensors according to the invention.
Figure 4B:
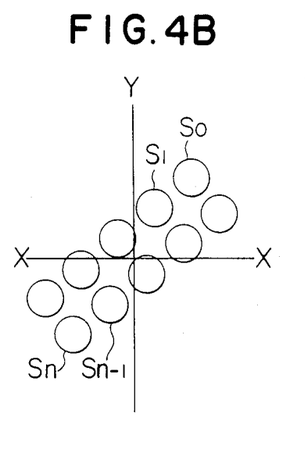
FIG. 4B illustrates another arrangement of photosensors according to the invention.

The photosensors can be arranged by disposing photoelectric elements $S_o, . . . S_{n-1}$, each of which has a pair or two pairs of photosensors $SA_o, SB_o, . . . SA_n, SB_n$ in the directions X and Y as illustrated in FIG. 4A or the photoelectric elements $S_o, . . . S_n$ each of which has a pair of photosensors $SA_o, SB_o, . . . SA_n, SB_n$, can be arranged in two rows in the direction of 45° with respect to X or Y as illustrated in FIG. 4B.

Figure 5A:
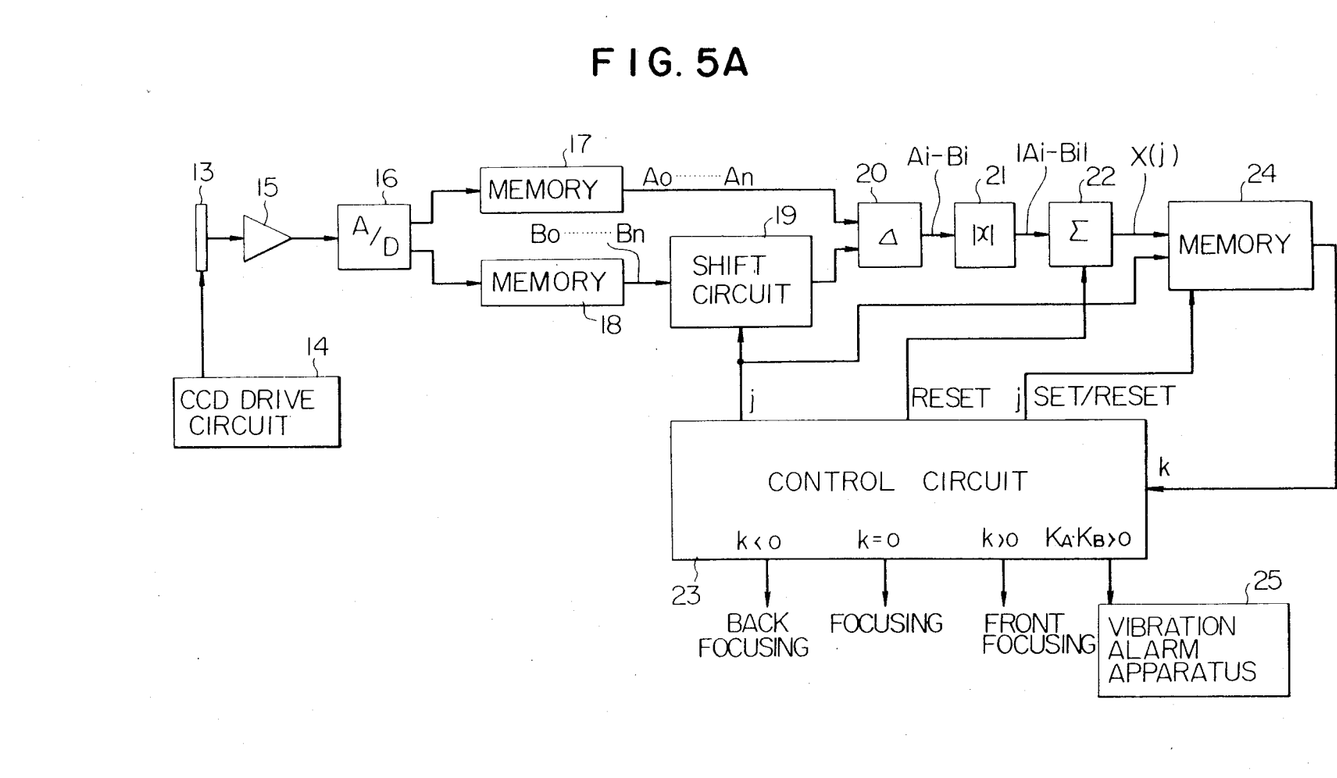
FIG. 5A illustrates a block diagram of a system for processing output data for use in the invention.

The photosensors $SA_o-SA_n$ and the photosensors $SB_o-SB_n$ respectively comprise one set of CCD (Charge Coupled Device) and the processing of their output data is performed by a system as shown in FIG. 5. In this system the set of CCD 13 is driven by a CCD driving circuit 14 so that the output signals of the CCD 13 are converted to digital signals through a video amplifier 15 and an A/D converter 16, and the converted digital signals are stored in memories 17, 18. In this case, output signals $A_o-A_n$ of the photosensors $SA_o-SA_n$ of group A are stored in the memory 17 and, at the same time, output signals $B_o-B_n$ of the photosensors $SB_o-SB_n$ of group B are stored in the memory 18. The output signals of the memory 18 are shifted by a shift circuit 19 and the differences between the output signals and the signals of the memory 17 are determined by a differential circuit 20. The output signals of the differential circuit 20 are converted to their absolute values by an absolute value conversion circuit 21 and their summation is obtained by an integration circuit 22. A control circuit 23 changes a shift value j of the shift circuit 19 and, at the same time, resets the integration circuit 22 and repeats the above-mentioned operation. Thus, by use of a memory 24, k is obtained, which is the value of j when the output of the absolute value conversion circuit is minimum, whereby it is detected whether the lens 11 is in the focusing state (namely the front focusing, in focus, or rear focusing) or in the vibration state.

Figure 6:
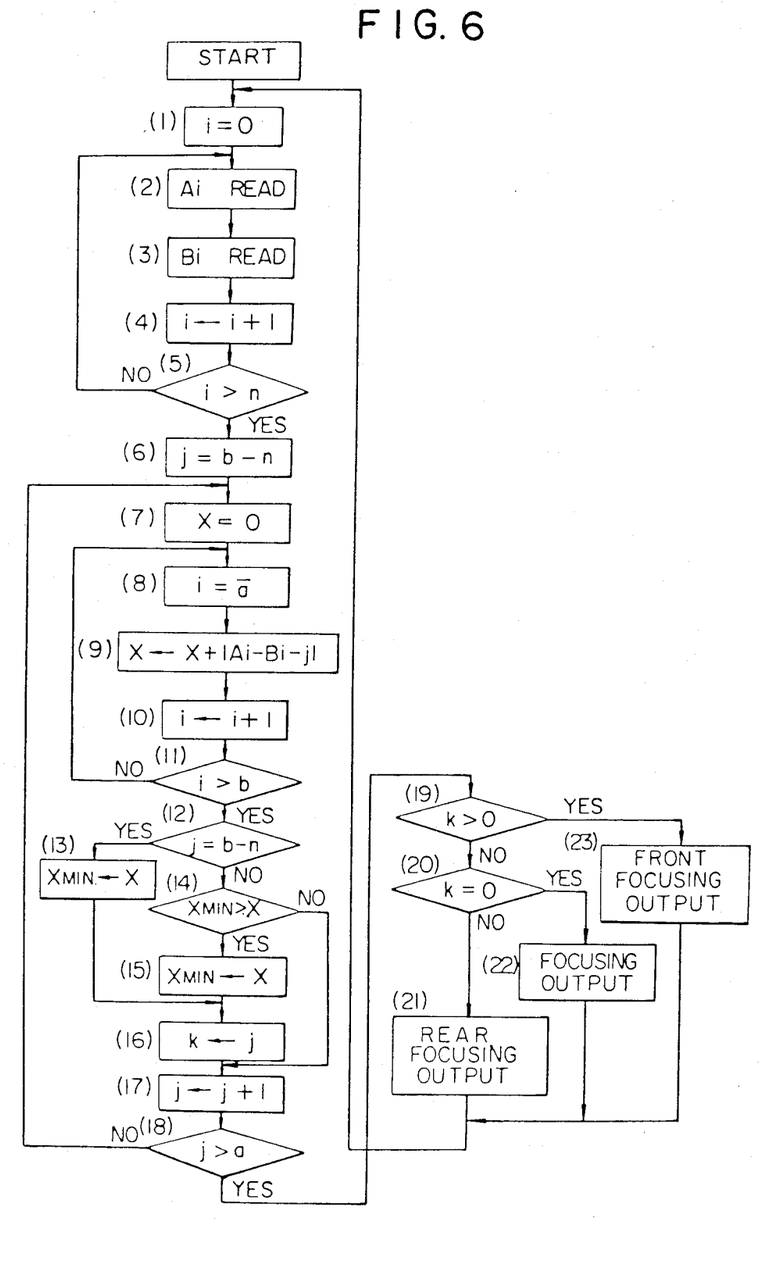
FIG. 6 illustrates a flow chart for detecting a focusing state according to the invention.

In order to detect the focusing state of the taking lens, the data $A_o-A_n$ and $B_o-B_n$ are read from the CCD 13 and stored in the memories 17, 18, (FIG. 5A), taking steps (1) through (5) as shown in a flow chart of FIG. 6.

Then the following operation is performed in steps (6)–(11) in FIG. 6.

$$X = \sum_{i=a}^{b} |A_i - B_{i-j}| \quad (1)$$

wherein
$0 < a < b < n$
$a \leq i \leq b$
$b - n \leq j \leq a$

Figure 7A:
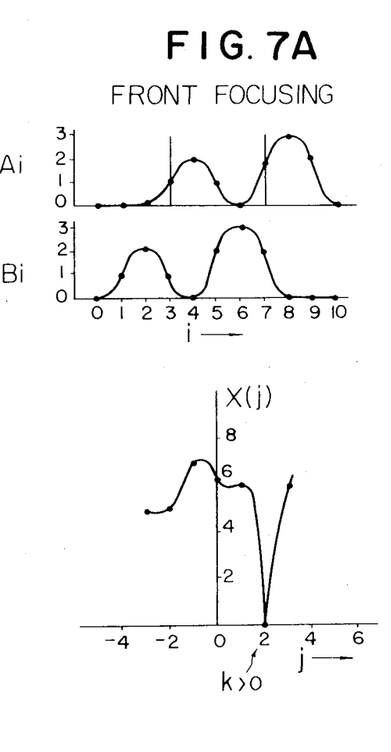
FIGS. 7A, 7B and 7C illustrate the relationship between each focusing state and a function X(j).
Figure 7B:
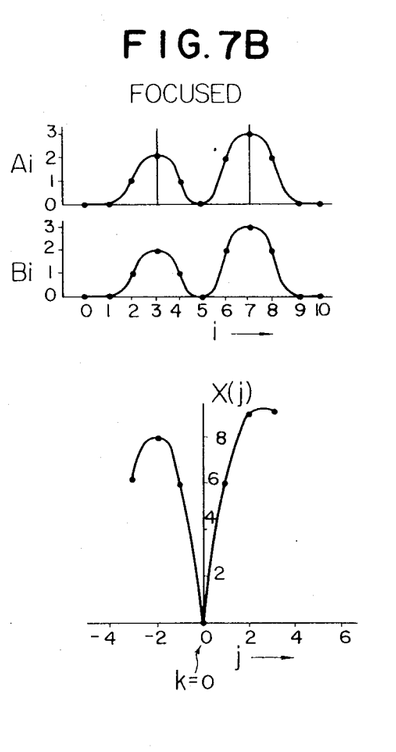
Figure 7C:
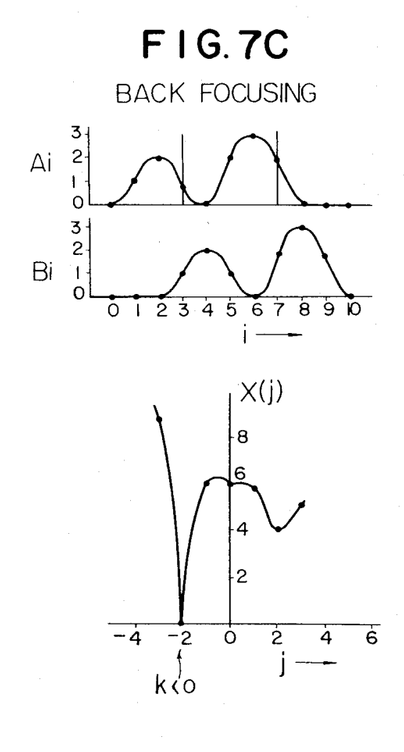

The result X of this operation is a function of the shift value J, that is, a function X(j), which is illustrated in FIGS. 7A to 7C. Hence, the relationship between the value k of the shift value j when X(j) becomes minimum and the focusing state of the taking lens is as follows.

$$\begin{array}{ll} \text{Front Focusing} & k > 0 \\ \text{In Focus} & k = 0 \\ \text{Rear Focusing} & k < 0 \end{array} \quad (2)$$

Figure 8:
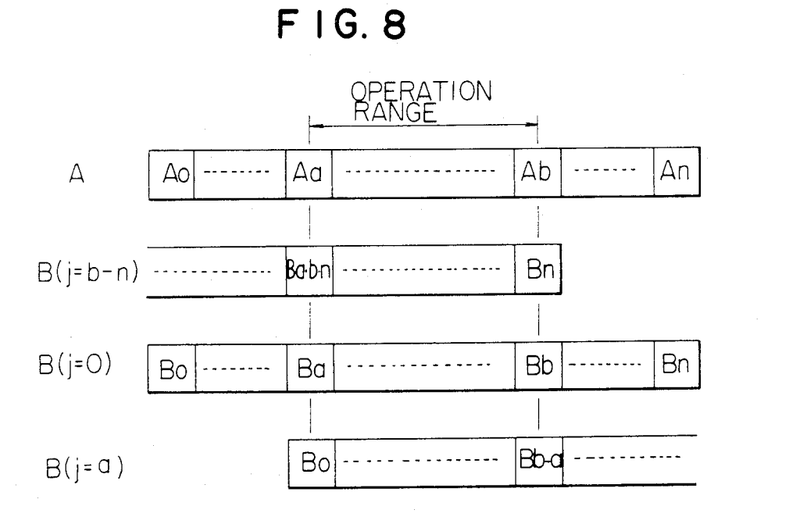
FIG. 8 shows the relationship between the data $A_o$–$A_n$ and $B_o$–$B_n$ and the shift.

In steps (12) through (18) initially (when $j=b-n$), X is regarded to be minimum $X_{MIN}$ and the minimum value $X_{MIN}$ is stored in the memory 24 and, at the same time, j is stored in the memory 24, supposing that $j=b-n$ is k. After increment of the shift value j, the operation is returned to the step (7). From the second operation on (when $j \neq b-n$), when the operation result X is smaller than the minimum value $X_{MIN}$ of the memory 24, the new minimum value $X_{MIN}$ and j are stored in the memory with k equalling the current j and the operation is returned to the step (7) after increment of the j, and when $X_{MIN} \leq X$, the operation is returned to the step (7) after increment of the j. FIG. 8 shows the relationship between the data $A_o-A_n$ and $B_o-B_n$ in the memories 17, 18 and the shift value j and the range for the operation in accordance with the previously mentioned equation (1). When j becomes greater than a, the operation is advanced to steps (19) through (23), so that the control circuit 23 detects the focusing state of the lens, namely whether the lens should be moved for front focusing, is in focus or should be moved for rear focusing, in accordance with the equation (2) based on the value k in the memory 14. In accordance with the output of the control circuit 23, the lens is driven by a lens driving motor to perform the focusing operation, or the focusing state is indicated by an indication apparatus so that the focusing operation can be performed manually. The lens 11 can constitute a photographing lens or can be a lens different from a photographing lens which is associated with the lens 11.

Figure 5B:
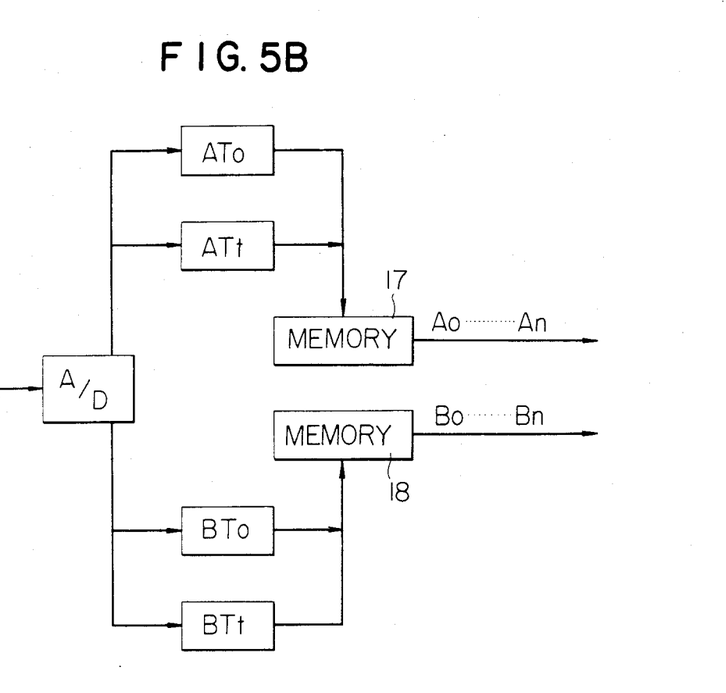
FIG. 5B illustrates part of a block diagram of another type of the system as shown in FIG. 5A.
Figure 9A:
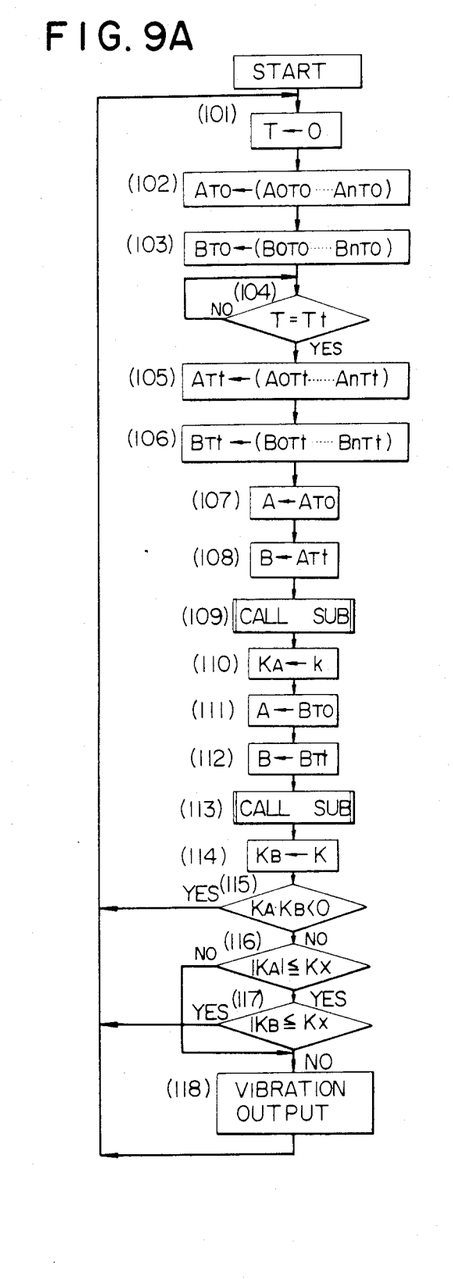
FIGS. 9A and 9B respectively illustrate a flow chart for detecting the vibrations of a camera.
Figure 9B:
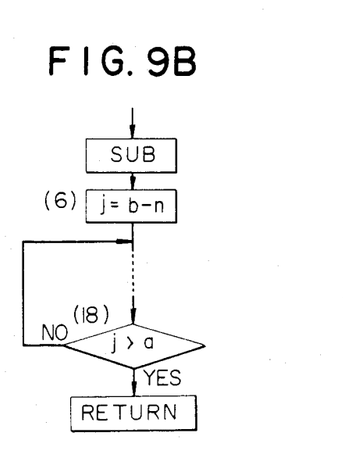

In order to detect the vibrations of the camera, memories $AT_o$ and $AT_t$ and memories $BT_o$ and $BT_t$ are respectively connected to the photosensor groups A and B as partly shown in FIG. 5B, and in accordance with the flow chart of FIG. 9A, a timer T is reset and the output signals $A_oT_o-A_nT_o$ and $B_oT_o-B_nT_o$ in the CCd 13 are stored in the memories $AT_o$ and $BT_o$ through the video amplifier 15 and the A/D converter 16. When a set time of the timer T has passed from time $T_o$ and now the time is $T_t$, the output signals $A_oT_t-A_nT_t$ and $B_oT_t-B_nT_t$ of the photosensors $SA_o-SA_n$ and $SB_o-SB_n$ of the CCD 13 are respectively stored in the memories $AT_t$ and $BT_t$ through the video amplifier 15 and the A/D converer 16. Then in steps 107 and 108, the contents of the memories $AT_o$ and $AT_t$ are transferred to the memories 17, 18 (A and B) and a jump is made to the sub-routine of FIG. 9B. This sub-routine is the same as the routine of the steps (6) to (18) in the flow chart in FIG. 6. By performing the above operation with respect to the signals $A_oT_o-A_nT_o$ and $A_oT_t-A_nT_t$, k is obtained and the k thus obtained is stored in the form of KA by returning to the main routine. In steps 111 and 112, the contents of the memories $BT_o$ and $BT_t$ are transferred to the memories 17, 18 (A, B) so that k is likewise obtained and the obtained k is stored in the form of KB. By detecting that $|KA| > KX$ or $|KB| > KX$ and that $KA \cdot KB$ is not negative ($KA \cdot KB \not< 0$), it is detected that the output phase of the photosensor groups A and B coincide with each other in their shifting directions, whereby state of vibration of the camera are detected.

Thus, in the embodiment of a vibration detection apparatus according to the invention, the rays of light which have been subjected to division are received by different photosensor arrays and an image formed by a lens, namely the position of an object relative to an optical apparatus comprising the lens and the change of the relative position with time, is converted to the phases of the output of the photosensor arrays, and by detecting the difference between the phases of a pair of photosensor arrays at a certain time, the focusing state of the lens is detected and the vibration of the lens can be detected from the change of the phases of the same photosensor arrays during a period of time. Since the output phases of the photosensor arrays change by the focusing process and also by the vibrations of the lens, the detection of the vibrations is performed on the basis of the direction of the change of the output of a pair of photosensor arrays.

Figure 10:
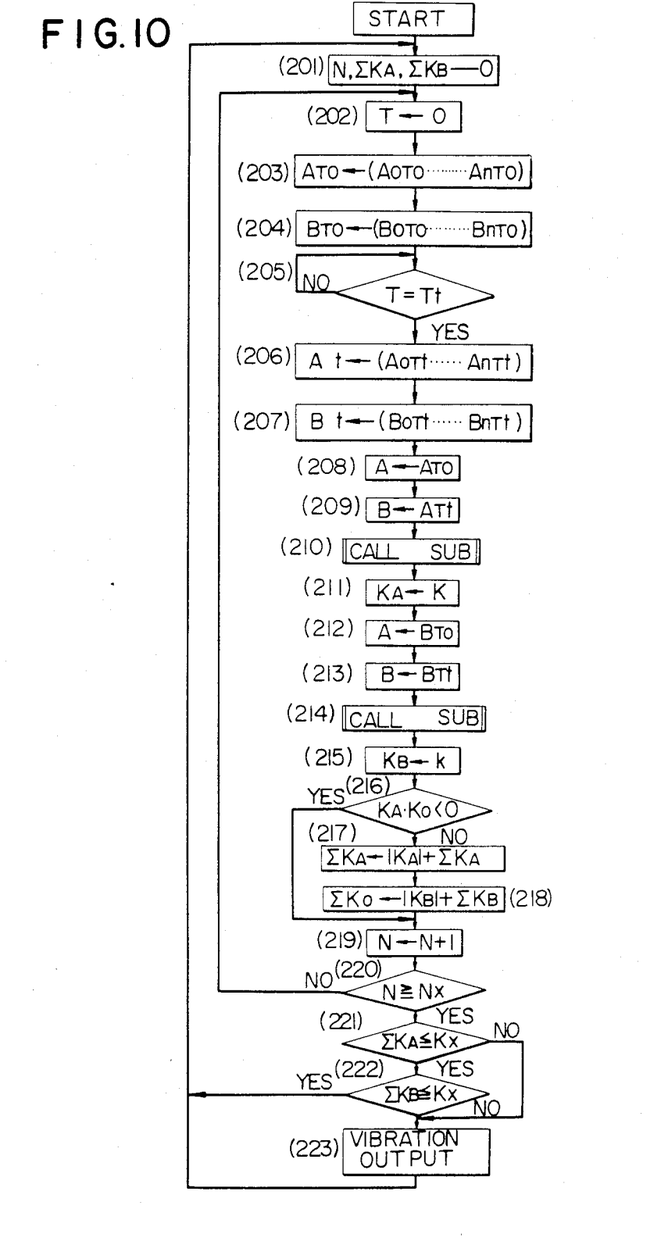
FIG. 10 illustrates a flow chart for detecting the vibrations of a camera and providing an alarm when vibrations exceed a certain level.
Figure 11:
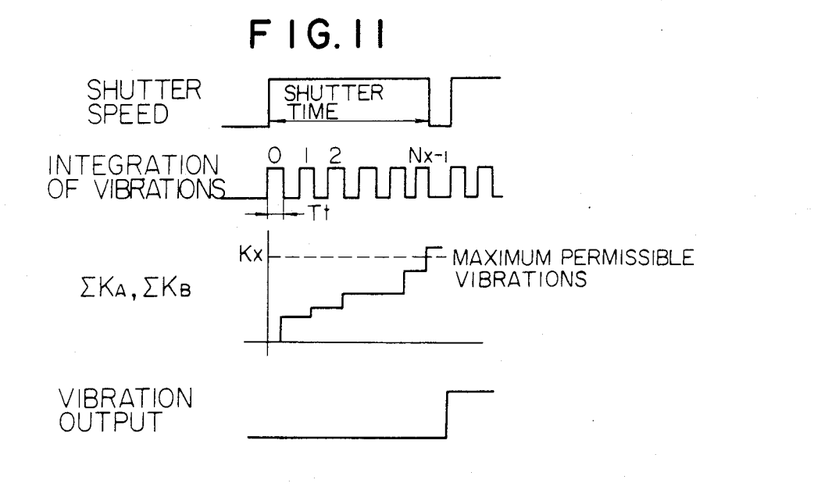
FIG. 11 illustrates time charts for detecting the vibrations of a camera.

When the vibration of a camera is detected and an alarm for indicating vibration is given, N, $\Sigma K_A$ and $\Sigma K_B$, which will be explained in detail, are respectively set at zero and the timer T is reset in accordance with a flow chart of FIG. 10 and the output signals $A_oT_o-A_nT_o$ and $B_oT_o-B_nT_o$ of the photosensors $SA_o-SA_n$ and $SB_o-SB_n$ in the CCD 13 are stored in the memories $AT_o$ and $BT_o$ respectively through the video amplifier 15 and the A/D converter 16. When a set time $T_t$ of the timer T has passed from time $T_o$, the output signals $A_oT_t-A_nT_t$ and $B_oT_t-B_NT_t$ of the photosensors $SA_o-SA_n$ and $SB_o-SB_n$ in the CCD 13 are stored in the memories $AT_t$ and $BT_t$, respectively through the video amplifier 15 and the A/D converter 16. In steps 208 and 209, the content of the memories $AT_o$ and $AT_t$ are transferred to the memories 17, 18 (A, B) and are then jumped to the sub-routine which is the same as the steps (6) to (18) in the flow chart of FIG. 6. With respect to the signals $A_oT_o-A_nT_o$ and $A_oT_t-A_nT_t$, k is obtained by the above-mentioned operation and the value of k thus obtained is stored in the form of KA by returning to the main routine. In steps 212 and 213, the contents of the memories $BT_o$ and $BT_t$ are transferred to the memories 17, 18 (A, B) so that k is obtained likewise and the k thus obtained is stored in the form of KB. This operation is repeated and when $KA \cdot KB$ is not negative (i.e., $KA \cdot KB \not< KO$), that is, when some vibrations occur, $|KA|$ and $|KB|$ are respectively integrated so that the vibrations are integrated. When the repetition number of the operation N becomes equal to a predetermined number NX, it is detected that the above-integrated values $\Sigma KA$ and $\Sigma KB$ are respectively $\Sigma KA > KX$ or $\Sigma KB > KX$ and that the shifting direction of the phase of the output of the photosensors of group A coincides with the shifting direction of the phase of the output of the photosensors of group B, so that the vibrations of the camera are detected, where KX is a permissible shift. FIG. 11 shows a time chart of the above-mentioned operation. The control circuit 23 gives an alarm when the camera is vibrated, by energizing a vibration alarming apparatus 25 in accordance with the above-mentioned vibration detection output. When the repetition number N is set at a predetermined number, the detection time Tt at each repetition is changed in accordance with the shutter speed when taking a photograph so that the vibration detection output is changed, whereby the vibration alarm can be given in accordance with each shutter speed. In this case, the vibration detection output of the control circuit 23 can be changed by changing the permissible shift KX in accordance with the shutter speed when taking a photograph or the vibration detection output can be changed by changing the repetition number NX in accordance with the shutter speed when taking a photograph.

In FIG. 5, the portions from the memories 17 and 18 through the control circuit 23 can be constructed by a micro computer.

What is claimed is:

1. An apparatus for detecting vibration of an optical apparatus, including means for dividing rays of light reflected from an image towards said apparatus, means including a plurality of paired photosensors for producing output signals in response to said divided rays of light, and means for comparing the phases of said output signals for each pair of photosensors and determining the level of vibration of said optical apparatus according to changes in the relationship between said phases during a predetermined time period, means for establishing a predetermined permissible level of vibration and means for indicating when the level of vibration determined by said apparatus has exceeded said predetermined permissible level.

2. An apparatus as in claim 1, said means for dividing rays of light including an imaging lens of a camera.

3. An apparatus as in claim 1, wherein said output signals of said paired photosensors being converted into digital form.

4. An apparatus as in claim 2, including means for automatically focusing said camera in response to the comparison of the phases of said output signals.

5. An apparatus for detecting the level of vibration of a camera, including means for dividing the rays of light received from an object to be photographed by said camera, means including a plurality of paired photosensors for producing output signals in response to said divided rays of light, means for comparing the phases of said output signals for each pair of photosensors and determining any changes in the relationship between said phases during a predetermined time period, means for establishing a predetermined permissible level of vibration and means for indicating when the level of vibration determined by said comparing means has exceed said predetermined level.

6. An apparatus as in claim 5, including means for automatically focusing said camera in response to the comparision of the phases of said output signals.

* * * * *